(12) United States Patent
Wang et al.

(10) Patent No.: US 7,042,571 B2
(45) Date of Patent: May 9, 2006

(54) LASER BENDING FABRICATION OF OPTICAL INTERLEAVERS

(75) Inventors: Steve Wang, San Jose, CA (US); Yin Zhang, San Jose, CA (US); Ming Shi, Pleasanton, CA (US); Johnny Zhong, Union City, CA (US)

(73) Assignee: Finisar Corporation, Sunnyvale, CA (US)

( * ) Notice: Subject to any disclaimer, the term of this patent is extended or adjusted under 35 U.S.C. 154(b) by 361 days.

(21) Appl. No.: 10/689,340

(22) Filed: Oct. 20, 2003

(65) Prior Publication Data

US 2004/0141181 A1 Jul. 22, 2004

Related U.S. Application Data

(60) Provisional application No. 60/419,472, filed on Oct. 18, 2002.

(51) Int. Cl.
*G01B 9/02* (2006.01)

(52) U.S. Cl. ............... 356/450; 356/519; 359/618

(58) Field of Classification Search ........ 356/450, 356/519; 359/577, 579
See application file for complete search history.

(56) References Cited

U.S. PATENT DOCUMENTS

| 6,154,952 | A | 12/2000 | Tangren |
| 6,268,951 | B1 | 7/2001 | Chen et al. |
| 6,301,046 | B1 | 10/2001 | Tai et al. |
| 6,658,172 | B1 * | 12/2003 | Scobey et al. ........ 385/15 |

OTHER PUBLICATIONS

Vikas Dhurka; WDM System Level; Apr. 2001; (pp. 3 and 14).
Essex Corporation; Hyperfine WDM: Passive Optical Technology for Fiber Optic Communications Application Note; (pp. 1-2).
T. Chiba, H. Arai, K. Ohira, H. Nonen, H. Okano, and H. Uetsuka; *Wavelength Splitters for DWDM Systems*; Otpoelectronic System Laboratory, Hitachi Cable, Ltd.; Oct. 2001; (pp. 1-3) http://www.ieee.org/organizations/pubs/newsletters/leos/oct01/chiba.htm.
Henri Rjabenbach; *Report of the European Conference on Optical Communication (ECOC)*; European Conference on Optical Communication (ECOC); Sep. 2001; (Page 17); http://www.ist-optimist.org/pdf/news/ECOC2001_report_Rajbenbach.pdf

* cited by examiner

*Primary Examiner*—Gregory Toatley
*Assistant Examiner*—Marissa J. Detschel
(74) *Attorney, Agent, or Firm*—Workman Nydegger

(57) ABSTRACT

An interleaver device and associated methods of manufacturing and calibration that use a laser bending technique to adjust the relative position of interferometers of the interleaver. The interleaver device includes a laterally divided housing with two lateral portions separated by supports. The supports are web like structures, the length of which can be adjusted in a predictable or measurable manner in response to a laser beam. The laser bending calibration and manufacturing technique uses a laser and a feedback and control system to adjust the spacing and angular relation between the lateral portions by partially melting one or more of the supports. The feedback and control system includes an optical detector, a computer, and a positioning system. This combination of components allows the interleaver device to be calibrated to precisely adjust the separation between channels within a WDM optical signal.

26 Claims, 2 Drawing Sheets

LASER BENDING FABRICATION OF OPTICAL INTERLEAVERS

CROSS-REFERENCE TO RELATED APPLICATIONS

This application claims the benefit of U.S. Provisional Application Ser. No. 60/419,472, filed Oct. 18, 2002, which is incorporated herein by reference.

BACKGROUND OF THE INVENTION

1. The Field of the Invention

This invention relates generally to the field of interleaver devices for use in optical networks. In particular, embodiments of the present invention relate to an improved interleaver device incorporating a laser bending calibration technique.

2. The Relevant Technology

Fiber optics are increasingly used for transmitting voice and data signals. As a transmission medium, light provides a number of advantages over conventional electrical communication techniques. For example, light signals allow for extremely high transmission rates and very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Light signals also can be conducted over greater distances without the signal loss typically associated with electrical signals on copper conductor.

Many conventional electrical networks are being upgraded to optical networks to take advantage of the increased speed and efficiency. One of the many required components of an optical network is an optical switching device. An optical switching device has the capability of switching an individual light signal between at least two different locations. Usually the optical signal is first demultiplexed or dispersed and the individual channels are switched and routed to specific locations. It is preferable to optically switch the optical signals rather than converting them to electrical signals and then switching them with conventional electrical switching techniques to maintain many of the advantages of optical networks.

The most common form of data transmissions within an optical network is wavelength division multiplexed (WDM) signals. A WDM signal is a single band of light that contains numerous different channels of information on its constituent wavelengths. For example, a particular band of light may have a wavelength range of 400 nanometers. This band of light can be broken up into numerous different subbands of smaller ranges of wavelengths. Each of these subbands can be referred to as an individual and distinct data channel, and generally do not interfere one with another. Therefore, one band of light can contain multiple independent data channels, each containing different data. Because of the demand for high bandwidth capabilities, there is an effort to increase the number of channels within a single band of light. This means that the subbands are compressed to smaller ranges of wavelengths, but still contain the same amount of information. This can lead to problems associated with separating or multiplexing the various channels for data processing.

In response to a demand for larger bandwidth capabilities, dense wavelength division multiplexing (DWDM) was developed. The term DWDM represents a standard of WDM in which the individual data channels are compressed together in a more dense configuration. For example, if a WDM signal has a 200 GHz channel spacing, a DWDM signal may have a 100 Ghz channel spacing. By decreasing the channel spacing, the overall bandwidth capabilities of a particular range of light are increased because more data channels could theoretically be included.

Because of the evolving channel spacing standards among optical signals, it has become more difficult to resolve or identify the individual channels within a very closely spaced optical signal. Therefore, a device is necessary that enables the spacing between the subbands or channels to be increased. An interleaver, or wavelength splitter, uses multiple interferometers to separate out the even and odd channels of a particular WDM signal into two output sets of channels, thereby enabling each of the two output sets of channels to have twice as much spacing between channels as the input set of channels. An interleaver is different from a multiplexer in that an interleaver does not separate individual channels, but rather simply increases the spacing between the channels such that they can more easily be processed. An interleaver can also be used to decrease the spacing between multiple channels by reversing the orientation of the interleaver device. This process of decreasing the spacing between the channels is generally referred to as deinterleaving. Interleavers and deinterleavers can also be used to increase and decrease the channel spacing in an optical signal such that various components that are configured to only work on a particular channel spacing can be utilized.

Optical interleavers must conform to very precise measurements to accurately increase the spacing evenly among the various channels and to ensure that particular channels are not cut off. If the resulting channel spacing is not even, data processing errors arise because specific channels are not be properly located. This effect is compounded by the number of channels in a single optical signal. For example, if a poorly calibrated interleaver device inconsistently separates the first few channels, all of the remaining channels will also be incorrectly positioned. Therefore, when a data processing device tries to obtain data from the various signals, it analyzes the wrong ranges of wavelengths, causing significant errors. In addition, it is possible for an interleaver device to cut off channels in the initial phase of separating out even and odd channels. For example, if the interleaver device is not properly calibrated to the spacing of the channels in the input signal, it may chop off signals, thinking it is separating between an even and an odd signal. Therefore, the calibration of an interleaver device is critical to its proper operation.

Optical interleavers have multiple variables or parameters which affect how the interleaver separates the even and odd channels in an optical signal. Depending on the type of optical interleaver, these parameters may include the length and angular relation of both the coupling layer and the cavity layers. In an interleaver utilizing two interferometers, the coupling layer is the spacing between the two interferometers. The coupling layer affects how the even and odd channels are separated into two different sets of channels. The cavity layer is the spacing between the mirrors in a Fabry-Perot style interferometer. The cavity layer in each of the interferometers affects how the two resulting sets of channels will be spaced.

Therefore, there is a need in the industry for an efficient method of manufacturing an interleaver device. The method should be cost effective, yet capable of manufacturing an interleaver consistent with extremely precise calibration measurements.

BRIEF SUMMARY OF EMBODIMENTS OF THE INVENTION

These and other problems in the prior art are addressed by embodiments of the present invention, which relates to an improved interleaver device that is fabricated using a laser bending calibration technique. The interleaver device is configured to precisely increase or decrease the separation between a set of individual channels within a WDM optical signal. The invention includes a calibration technique that applies a laser bending process to a set of adjustable supports which are incorporated into the interleaver device.

According to one aspect of the invention, the interleaver device includes a laterally divided housing, a plurality of interferometers and a plurality of supports. The laterally divided housing further includes two lateral portions that are separated by a circumferential space and are connected across the space by a set of supports. The lateral portions are cylindrically shaped hollow structures that have an opening on either lateral end. At least one interferometer is located inside each of the two lateral portions. The interferometers are Fabry-Perot type interferometers that include two reflective devices facing one another. The supports that connect the two lateral portions across the circumferential space are webs that fix the two lateral portion at a specific distance and specific angular relation from one another. There are, for example, four evenly angularly spaced supports located at the circumferential extremes between the two lateral portions. The supports are formed from a material that changes dimensions in a predictable or measurable manner in response to a laser beam.

The calibration technique includes a WDM input signal, a first and a second WDM output signal, a detector, and a laser system that is used to perform a laser bending operation on the housing. The WDM input signal is transmitted into the divided housing in a manner to proceed through all of the interferometers and exit the divided housing at a different location becoming the first and second WDM output signal. The detector is positioned at the point where the WDM output signals exit the laterally divided housing such that the detector can accurately detect the contents of the WDM output signals. The detector transfers the information that is detected about the WDM output signals to the laser system. The laser system further includes a computer, a laser and a positioning system. The computer interprets the detector information and instructs the positioning system to direct the laser to the appropriate supports on the interleaver device. The laser transmits a laser beam onto the supports to modify the dimensions of the one or more supports in such a manner as to correct any errors or aberrations caused by the spacing or angular relationship between the lateral portions of the interleaver device.

This laser bending operation enables the interleaver device to be accurately calibrated at a relatively low cost. As a result, the cost of multiplexing and demultiplexing WDM and DWDM signals can be significantly reduced, thereby making widespread use of these optical communication techniques more economically feasible. The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general the present invention relates to an improved interleaver device incorporating a laser bending calibration technique. The interleaver device is configured to precisely increase or decrease the separation between a set of individual channels within a WDM optical signal. The invention includes a calibration technique that utilizes a laser bending process upon a set of adjustable supports that connect two structures, each of which hold one of two interferometers included in the interleaver device. Also, while embodiments of the present invention are described in the context of an interleaver device and a calibration technique, it will be appreciated that the teachings of the present invention are applicable to other applications as well in which optical components are to be precisely positioned with respect to each other.

Figure 1:
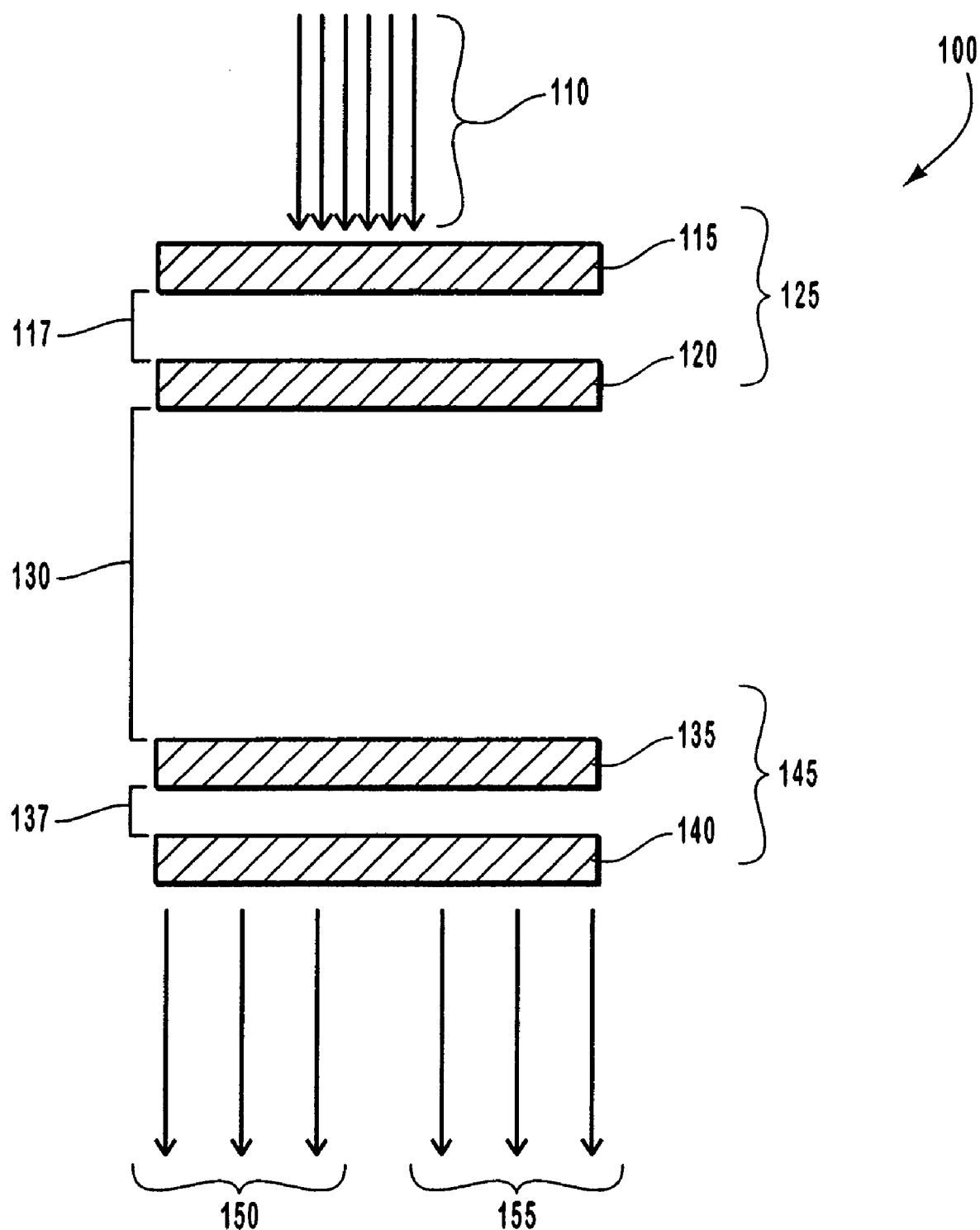
FIG. 1 illustrates a schematic ray trace diagram of an interleaver containing two Fabry Perot interferometers, illustrating how the interferometers increase the spacing of the channels of a WDM input signal.

Reference is first made to FIG. 1 which illustrates a schematic ray trace diagram of an interleaver containing two Fabry Perot interferometers illustrating how the interferometers increase the spacing of the channels of a WDM input signal, designated generally at 100. The interleaver 100 accepts a WDM input signal 110 from an input side and separates the even and odd channels to create a first and second WDM output signal 150, 155 respectively, exiting from the interleaver from an output side. Likewise, two input signals could be input into the output or lower side of the illustrated interleaver to create an de-interleaver device. A deinterleaver device would decrease the spacing between the channels in the two different input signals by combining them together. The individual channels within the input signal 110 and output signals 150, 155 are each contained on a subband or set of wavelengths. When the device is used as an interleaver to separate the even and odd channels, the spacing within each set of channels is doubled because there are only half as many channels to fit into the same range of wavelengths. Likewise, if the device is used as a de-interleaver to combine two sets of WDM channels, the spacing between the channels is cut in half because there are twice as many channels to fit into the same range of wavelengths. For example, in a dense wavelength division multiplexed signal (DWDM) the channel spacing may be 100 Ghz. A DWDM signal could be converted into a two standard WDM signals with a channel spacing of 200 Ghz by transmitting the DWDM signal into the interleaver 100. By increasing the channel spacing between adjacent channels in an optical signal, the individual channels can be resolved more easily by a detection mechanism.

The interleaver 100 further includes a pair of interferometers 125, 145. Interferometers generally project interference fringes. In the case of an interleaver device, the interferometers are used to separate out the even and odd signals from a WDM signal. By separating out these signals, the spacing between the individual channels in either of the signals is effectively doubled because one output signal contains only the even channels and another output signal only contains the odd channels. In the illustrated embodiment, the interferometers 125, 145 are Fabry Perot type interferometers. Fabry Perot interferometers include two reflective devices facing one another. Alternatively, the interferometers could be Michelson or Sagnac type interferometers. The first interferometer 125 further includes a first mirror 115, a cavity distance 117 and a second mirror 120. Likewise, the second interferometer further includes a first mirror 135, a cavity distance 137, and a second mirror 140. The mirrors in both of the interferometers cause incoming signals to bounce back and forth between the two mirrors. The cavity distance in each of the interferometers can be used to calibrate how the interferometers separate the even and odd signals. The first interferometer 125 is calibrated to project the even channels from the input signal 110 and the second interferometer 145 is calibrated to project the odd channels from the input signal 110. The even channels are directed to a first output signal 150 and the odd channels are directed to a second output signal 155. The interleaver device 100 also includes a coupling distance 130 between the two interferometers 125, 145. The coupling distance controls how the resulting even and odd signals are combined to form the output signal 150. The coupling distance must be precisely configured in order to reliably position the channels at consistent distances apart from one another in the output signal 150. In addition, the two interferometers must be substantially parallel to one another in order to create an accurate output signal 150 with the proper channel spacing.

In operation, the interleaver device 100 illustrated in FIG. 1 receives the input signal 110 into the first interferometer 125. The first interferometer creates an interference pattern showing the even channels and the second interferometer creates an interference pattern showing the odd channels.

Figure 2:
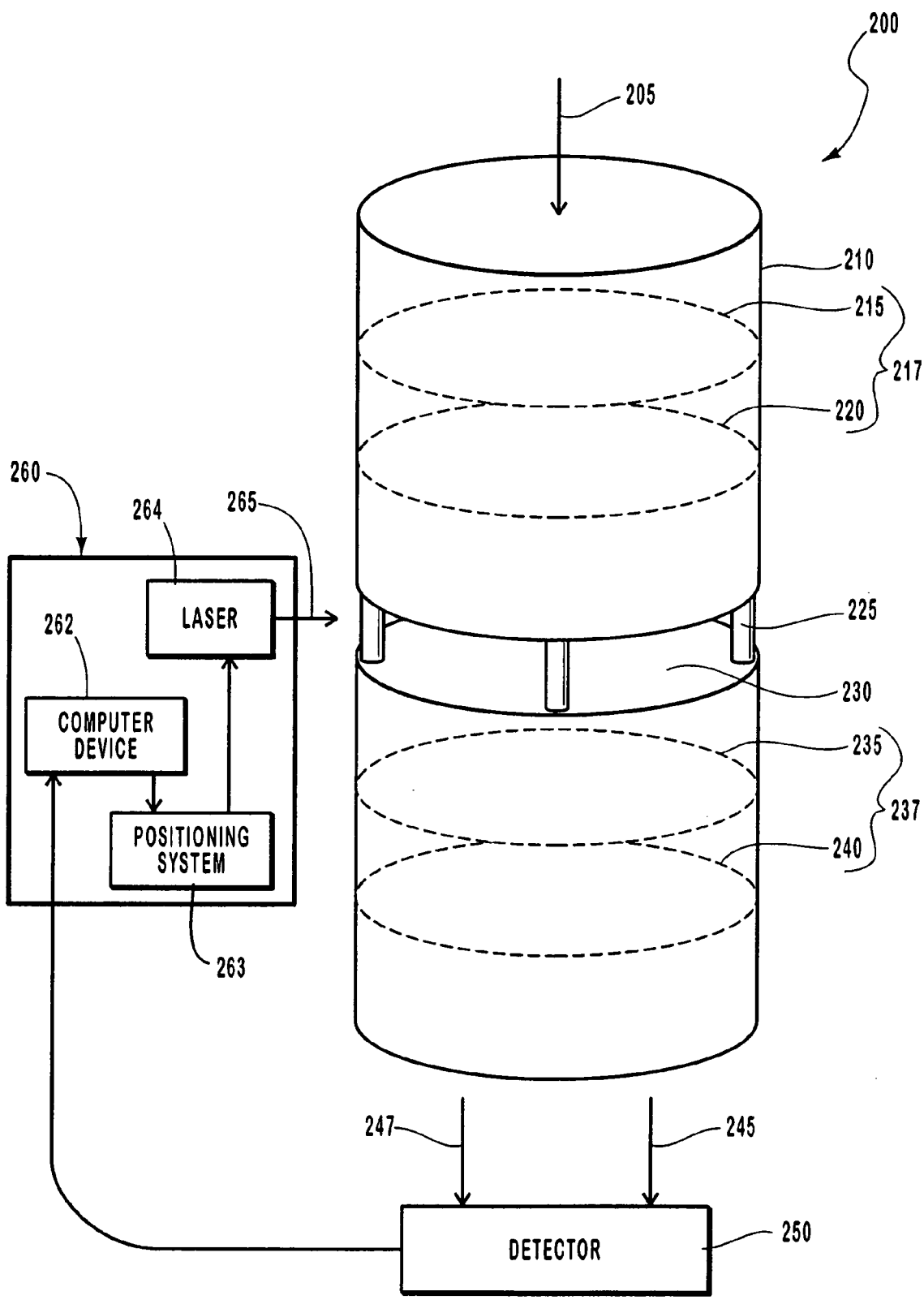
FIG. 2 illustrates a perspective view of an interleaver and a calibration system, wherein the interleaver device is connected to a calibration system to precisely adjust the coupling layer between the two interferometers.

Reference is next made to FIG. 2, which illustrates a perspective view of an interleaver and a calibration system, wherein the interleaver device is connected to a calibration system to precisely adjust the coupling distance associated with the coupling layer between the two interferometers, designated generally at 200. The interleaver device further includes a laterally divided housing including two lateral portion 210, 230, first and second interferometers 217, 237, and a set of supports 225. The optical characteristics of the interleaver device are described in more detail with reference to FIG. 1. The first interferometer 217 includes a first mirror 215 and a second mirror 220. The second interferometer 237 includes a first mirror 235 and a second mirror 240. A set of supports 225 are disposed between and connect the two lateral portions of the laterally divided housing 210. The supports 225 are positioned to fix the two lateral portions at a specific distance apart from one another and at a specific angular relation with respect to one another. The supports are webs that are positioned in the annular space that separates the two lateral portions of the laterally divided housing 210, 230, and are formed from a materials that reacts to energy supplied by a laser by contracting. As shown in FIG. 2, the number of supports 225 can be four, which is a convenient number for controlling the coupling distance 200 and the relative angular position of the interferometers 217, 237. In general, the number of supports 225 should be sufficient to adequately secure the two lateral portions of the laterally divided housing 210, 230 with respect to one another to prevent both linear translation and angular rotation after the fabrication and calibration process is completed. Moreover, the number of supports 225 should be sufficient to enable the angular rotation of the two lateral portions of the laterally divided housing 210, 230 to be controlled about two perpendicular axes of rotation that are orthogonal with respect to the longitudinal axis of the housing. In general, at least three supports 225 are sufficient to provide these results. Moreover, as the number supports 225 exceeds four or five, the ability to accurately control the relative position of the interferometers 217, 237 during the laser bending operation diminishes. The first and second interferometers 217 237 are Fabry Perot interferometers and are described in more detail with reference to FIG. 1.

With continued reference to FIG. 2, in addition to the interleaver device to be calibrated, the calibration system includes a detector 250 and a laser system 260. The detector 250 is an optical detector such as a charge-coupled device (CCD) array that is capable of detecting the intensity of light across a two dimensional plane. The detector 250 is positioned to receive or capture a first and second output signal 245, 247 from the interleaver device. The first output signal 245 represents the even channels from the input signal 205 and the second output signal 247 represents the odd channels from the input signal 205. Since the interleaver device can be used to either interleave or de-interleave a signal depending upon its orientation, the detector 250 can be positioned at either end of the interleaver device, so long as it is opposite the input signal 205. In the illustrated embodiment, the detector 250 is positioned below the interleaver device to receive a first and second output signal 245, 247 in which the channel separation in each of the out signals is greater than the channel spacing in the input signal 205.

The detector 250 is electrically connected to the laser system 260 such that data captured by the detector is used to control the operation of the laser system 260. The laser system 260 further includes a computer device 262, a laser 264 and a positioning system 263. The computer device 262 stores and interprets the information obtained from the detector and determines if the interleaver device needs to be calibrated. The positioning system 263 electrically controls which of the supports 225 the laser 264 impacts.

The laser 264 generates a heat inducing laser beam 265 that is configured to adjust the dimensions of at least one support 225 in a predictable or measurable manner upon contact. For example, if a WDM test signal is sent into the interleaver device, and the resulting channels in the first and second output signals 245, 247 are accurately deinterleaved, the detector 250 detects the optical characteristics of the output signals 245, 247 and transmit this information over a data link to the laser system 260. The computer device 262 within the laser system 260 then interprets the data generated by the detector 250 to determine if an error or aberration is present in the output signal indicating a misalignment of the interleaver device. If an error or aberration is present, the computer device 262 then determines if the error is attributable to the spacing or angular relation between the two portions of the laterally divided housing 210, 230. If this is the case, the computer device 262 determines which of the supports 225 need to be adjusted in order to properly calibrate the interleaver device. The computer device 262 subsequently determines how much each support must be adjusted to properly calibrate the interleaver device or, in the alternative, monitors the output of the interleaver as the adjustment is being made to determine when the support has been appropriately adjusted.

This information is used by the positioning system 263 to control the laser 264 and to cause the laser 264, as necessary, to transmit a heat inducing laser beam 265 upon the particular supports 225 for a finite amount of time. This form of manipulation of the dimensions of the supports 225 can be used to precisely align the two lateral portions 210, 230 of the laterally divided housing with three degrees of freedom, including linear translation substantially along the longitudinal axis of the housing and angular rotation about two perpendicular axes of rotation that are orthogonal with respect to the longitudinal axis of the housing 210.

The calibration system can also be used to periodically recalibrate an interleaver device that is in use in an optical data network. Over the lifetime of an optical component, periodic changes can occur in the output. This is usually attributable to drift characteristics associated with degradation of materials. The calibration system described in reference to FIG. 2 can be used to periodically monitor the status of an interleaver device and recalibrate the device as needed by simply transmitting a laser beam upon one or more of the supports to adjust the spacing or angular relationship between the two lateral portions of the interleaver. The only limitation to this configuration is that the calibration system generally only reduces the physical dimensions of the supports.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. An optical interleaver comprising:
    a laterally divided housing, wherein the laterally divided housing further includes two lateral portions;
    at least two interferometers wherein at least one interferometer is positioned within each of the two lateral portions of the laterally divided housing; and
    a plurality of supports comprising at least two supports positioned between the two lateral portions of the laterally divided housing.

2. The optical interleaver of claim 1, wherein the two lateral portions of the laterally divided housing are cylindrically shaped hollow structures.

3. The optical interleaver of claim 2, wherein the at least two supports are positioned at circumferential extremes between the two lateral portions of the laterally divided housing and are equally angularly spaced apart from one another.

4. The optical interleaver of claim 1, wherein the at least two interferometers are Michelson type interferometers.

5. The optical interleaver of claim 1, wherein the at least two interferometers are Sagnac type interferometers.

6. The optical interleaver of claim 1, wherein the at least two interferometers are Fabry Perot interferometers further including two reflective devices facing one another.

7. The optical interleaver of claim 1, wherein the plurality of supports comprise at least three supports positioned between the outer edges of the two lateral portions of the laterally divided housing such that the supports create a fixed distance and a fixed angle between the two lateral portions.

8. The optical interleaver of claim 1, wherein the at least two supports are formed from a material that changes dimensions in a predictable manner in response to the application of a laser beam.

9. An optical interleaver calibration system comprising:
    a laterally divided housing, wherein the laterally divided housing further includes two lateral portions, wherein at least one interferometer is within each of the two lateral portions, and wherein at least two supports are positioned between the two lateral portions of the laterally divided housing;
    a detection mechanism disposed at one lateral end of the laterally divided housing;
    a waveguide positioned to insert a WDM input signal at a second end of the laterally divided housing such that the WDM input signal is transmitted through the at least one interferometer from each of the two lateral portions such that a resulting set of signals impacts the detection mechanism; and
    a laser system that is configured to change the dimensions of any of the at least two supports, wherein the laser system is controlled based on data obtained by the optical detection mechanism.

10. The optical interleaver calibration system of claim 9, wherein the two lateral portions of the laterally divided housing are cylindrically shaped hollow structures.

11. The optical interleaver calibration system of claim 9, wherein the interferometers are Fabry Perot interferometers further including two reflective devices facing one another.

12. The optical interleaver calibration system of claim 9, wherein the interferometers are Michelson type interferometers.

13. The optical interleaver calibration system of claim 9, wherein the interferometers are Sagnac type interferometers.

14. The optical interleaver calibration system of claim 10, wherein the at least two supports are positioned at circumferential extremes between the two lateral portions of the laterally divided housing.

15. The optical interleaver calibration system of claim 9, wherein there are four supports positioned at the outer edges between the two lateral portions of the laterally divided housing such that the supports create a fixed distance between the two lateral portions and a fixed angle between the two lateral portions.

16. The optical interleaver calibration system of claim 9, wherein the at least two supports are web like materials that change dimensions in a predictable manner in response to the application of a laser beam.

17. A method of calibrating an optical interleaver, comprising the acts of:
    obtaining an optical interleaver that includes:
        two optical interferometers; and
        a plurality of supports that establish a relative position of the two optical interferometers; and
    in response to data indicative of the relative position of the two optical interferometers, selectively applying a laser beam to at least one of the plurality of supports, thereby adjusting the relative position of the two optical interferometers and calibrating the optical interleaver.

18. The method of claim 17, wherein the method further includes an act of positioning a detection mechanism at one lateral end of the laterally divided housing such that the detection mechanism generates the data indicative of the relative position of the two optical interferometers.

19. The method of claim 18, wherein the method further includes an act of transmitting the data indicative of the relative position of the two optical interferometers to a computer device that is operably connected to a laser system.

20. The method of claim 17, wherein the method further includes an act of transmitting an input signal into the optical interleaver such that the input signal is transmitted through the two optical interferometers.

21. The method of claim 17, wherein the act of selectively applying a laser beam to at least one of the plurality of supports changes the physical dimensions of the support at which the laser beam is applied.

22. A method of calibrating an optical interleaver, comprising the acts of:
   transmitting an input optical signal having multiple channels into an optical interleaver that includes:
      two optical interferometers; and
      a plurality of supports that establish a relative position of the two optical interferometers; and
   in response to data obtained by detecting an output optical signal generated by the optical interleaver, selectively applying a laser beam to at least one of the plurality of supports, thereby adjusting the relative position of the two optical interferometers and calibrating the optical interleaver.

23. The method of claim 22, wherein the method further includes an act of positioning a detection mechanism at one lateral end of the laterally divided housing such that the detection mechanism generates the data indicative of the relative position of the two optical interferometers.

24. The method of claim 23, wherein the method further includes an act of transmitting the data indicative of the relative position of the two optical interferometers to a computer device that is operably connected to a laser system.

25. The method of claim 22, wherein the input optical signals is transmitted through the two optical interferometers of the optical interleaver.

26. The method of claim 22, wherein the act of selectively applying a laser beam to at least one of the plurality of supports changes the physical dimensions of the support at which the laser beam is applied.

* * * * *